United States Patent [19]

Martin

[11] Patent Number: 4,834,694
[45] Date of Patent: May 30, 1989

[54] BELT TENSIONING APPARATUS

[75] Inventor: Kelly D. Martin, Lawndale, N.C.

[73] Assignee: INA Bearing Co., Inc., Fort Mill, S.C.

[21] Appl. No.: 223,376

[22] Filed: Jul. 25, 1988

[51] Int. Cl.⁴ ............................................. F16H 7/12
[52] U.S. Cl. ................................................. 474/135
[58] Field of Search ............... 474/101, 109, 111, 117, 474/118, 133, 135

[56] References Cited

U.S. PATENT DOCUMENTS

| | | | |
|---|---|---|---|
| 4,285,676 | 8/1981 | Kraft et al. | 474/135 |
| 4,392,840 | 7/1983 | Radocaj | 474/117 |
| 4,472,162 | 9/1984 | Hitchcock | 474/135 |
| 4,504,252 | 3/1985 | Honma | 474/112 |
| 4,525,152 | 6/1985 | Speer et al. | 474/133 |
| 4,536,172 | 8/1985 | Burris et al. | 474/135 |
| 4,563,167 | 1/1986 | Foster | 474/135 |
| 4,583,962 | 4/1986 | Bytzek et al. | 474/113 |
| 4,723,934 | 2/1988 | Thomey | 474/135 |

*Primary Examiner*—Thuy M. Bui
*Attorney, Agent, or Firm*—Wigman & Cohen

[57] ABSTRACT

Apparatus for applying an optimum tensioning force to an endless belt or the like, including a pivot defining a first pivot axis, a belt engagement element supported for rotation about the first pivot axis, a biasing element for urging the belt engagement element in a first direction of rotation about the pivot axis into belt-tensioning engagement with the belt, and a belt tension adjuster, responsive to externally induced changes in tension of the belt, for automatically varying the tensioning force applied to belt. The belt tension adjuster is disposed within the biasing element and includes a limiter for limiting the amount of decrease in applied tensioning force, whereby the tension in belt is optimally maintained.

36 Claims, 3 Drawing Sheets

BELT TENSIONING APPARATUS

FIELD OF THE INVENTION

The present invention relates to belt tensioning devices, and more particularly to spring-biased belt tensioning devices adapted for maintaining an optimum tension on endless driving members, such as belts or chains, of internal combustion engine drive systems.

DESCRIPTION OF THE PRIOR ART

In the automotive engine industry, it has become the practice to use a single endless member, such as a belt or chain, to maintain synchronous operation of a "primary" system of engines components, such as the crank shaft, the camshaft, the spark distributor, the ignition, the fuel injecion, the valves, and in some cases, balance shafts. In typical engine applications, the single endless member is driven in motion by a pulley or sprocket gear connected to the engine crank shaft. The endless member, in turn, is coupled by appropriate means with a "secondary" system of engine components, such as the alternator, various pumps and accessory equipment.

A frequently encountered problem in using single endless belts as power transmission members involves maintaining contact between the belt and the belt-engaging members carried by the various primary and secondary components of the engine in order to provide a desired level of tensioning of the belt. Single endless belts used in this environment for this purpose are typically formed with a surface specifically adapted for engagement with the component carried, belt-engaging members. Typically, where the belt-engaging members are embodied as pulleys, the belt is provided with a smooth, flat surface, while where the belt-engaging members are embodied as sprocket wheels or gears, the belt is provided with ribbing or other similar surface protrusions. In either case, it is mandatory to ensure that contact between the belt and the belt-engaging members of the primary system components be maintained so that synchronus operation be sustained. It is furthermore desirable to maintain contact between the belt and the belt-engaging members of the secondary system components so that optimum operating efficiency can be achieved.

Loss of contact between the belt and the belt-engaging member is evidenced in different ways, depending on the structure of the belt-engaging member. In the case of pulley-type belt-engaging members, loss of contact is manifested by slipping of the belt, which arises as a result of stretching of the belt or through a whipping condition caused by repeated, sudden, accelerations and decelerations of the belt. In the case of sprocket-type belt engaging members, loss of contact is manifested by the belt "jumping" from one tooth to another or slipping off any one of the teeth. In either case, the result is a diminishment of efficiency in the operation of the engine, and worse, the possibility of damage to the engine, the primary and secondary components, or the belt itself. Therefore, to minimize the possibility of occurrence of such damage and to ensure optimum operating efficiency for the engine and the driven primary and secondary components, it has become necessary to apply, through suitable mechanims, an "optimum tension" to the single endless belt. As used above and hereinafter, "optimum tension" refers to the minimum tensioning force which can be applied to the belt while still being of sufficient amount to prevent slippage of the belt relative to the pulley or jumping of the belt off or over the teeth of a sprocket wheel or gear.

Numerous tension applying devices have been proposed to accomplish these purposes. One type of tensioner uses a bushing formed of an elastomeric material which is placed in compression by some mechanical means for continuously exerting a tensioning force on a belt. Tensioner constructions of this type, however, have the disadvantage that the high load rate which they exert on the belt results in a rapid loss of tensioning as the belt stretches, and the load rate limits the stroke of the belt-engaged idler pulley to a shorter distance than desired. Also, sudden acceleration and deceleration of the drive belt can cause a whipping action to occur which creates a time lag before full damping is achieved.

Other belt tensioning devices use coil springs which are either in compression or tension, for applying and maintaining the tensioning force on a belt-engaging pulley or sprocket. Devices of this kind, some of which employ the biasing force of a coil spring in combination with hydraulic-actuated members, regulate the amount of applied tensioning force, depending on whether the engine is running or shut off. These devices, however, have the disadvantage that the coil springs develop undesirable vibration harmonics, which when the engine is running, diminish the effectiveness of the devices as tensioners by causing periodically excessive tightening and loosening conditions.

Still other known tensioning devices and arrangements include biasing mechanisms in combination with some type of mechanical retaining means. For example, in U.S. Pat. No. 4,634,407 to Holtz, a ratchet and pawl retainer is employed to maintain a minimum amount of tensioning force on a belt, while in U.S. Pat. No. 4,392,840 to Radocaj, a one-way roller clutch is used to permit movement of a tensioner in a belt tensioning direction when the belt extends, while preventing movement in the reversed, non-tensioning direction. The retaining mechanisms of these devices, however, suffer the disadvantage that the tensioning force on the endless drive belt can only be increased, and no mechanism is provided for the accommodation of undesirable belt whipping effects, (e.g., excessive stressing).

Still other tensioner devices are known which address the problem of resonant forces that have been set up within the tensioner devices. Such resonant forces, e.g., varying loads and vibrations, typically occur as a result of cyclic loading and unloading of valve springs, or as a consequence of piston power strokes. One tensioner device (U.S. Pat. No. 4,583,962 to Bytzek et al) purports to accommodate such undesirable internal resonant forces by incorporating a nylon sleeve between a fixed pivot member and a pulley-supporting member pivotally mounted on the pivot member. However, the sleeve of this tensioner is made of a material which has the approximate hardness of wood and functions only as a bearing sleeve, thereby providing primarily only sliding friction damping and substantially no solid damping. Thus, any forces or torques transmitted from the belt and engine to the pulley-supporting member which tend to move the pulley-supporting member in an orbiting manner about the pivot member are undamped, thereby resulting in the undesired internal resonant vibrations from which all other known tensioning devices suffer.

An additional problem, which has been recognized but not solved by any of the known prior devices, involves the effects of temperature changes on tension in the belt. From engine start-up until engine shut-down, temperatures of, and in the vicinity of, the engine fluctuate to such an extent that temperature-dependent operational parameters (e.g., pulley or sprocket diameters, belt length, and relative positions of the components) of the belt drive system vary, resulting in increased tension on the belt.

Therefore, in order to accommodate the variance of such temperature-dependent operational parameters as well as belt stretching and whipping and the effects of resonant forces, while maintaining an optimum tension on the belt, it would be desirable to provide a mechanism capable of continuousl self-adjusting, contemporaneously with operation of the engine, to vary the amount of tensioning force applied to the belt. Since adjustments of this kind are almost impossible, if not impractical, to make while the engine is operating, it would be desirable to provide a belt-tensioning device having an automatic mode of self-adjustment so that the changes in dimension and position of the components, which occur as the temperature of the engine changes and which alter the tensioning requirements for the belt, can be effected by the belt tensioning device itself, without human intervention.

OBJECTS OF THE INVENTION

It is therefore a principal object of the present invention to overcome all the drawbacks and disadvantages of the prior tensioning devices by providing a tensioning apparatus adapted for use with an endless power transmission member, such as a belt or chain, which will continuously apply a tensioning force against the endless member while permitting automatic adjustment of the tensioning force throughout all modes of operation of the engine.

Another object of the present invention is to provide a belt tensioning apparatus capable of continuously maintaining a predetermined amount of tension on the drive belt of an engine, while compensating for belt harmonics and automatically adjusting the amount of applied tension in response to thermally-induced component expansion and contraction.

Still another object of the present invention is to provide a belt-tensioning mechanism capable of movement in one direction for applying a tensioning force to an engine belt to eliminate slack and minimize belt whipping on engine start-up, and further capable of limited movement in the opposite direction for automatically adjusting the applied tensioning force during engine operation or on engine shut-down.

Still another object of the invention is to provide a belt-tensioning mechanism for dampening harmonic vibrations imparted to the belt by various systems and devices attached to, and driven by, an engine.

Yet another object is to provide a belt-tensioning mechanism which is of simple construction, compact, and easily installable in its intended environment without the need for special tools.

Still another object is to provide a tensioning mechanism which is adapted to be preset so that, upon installation of the tensioning mechanism, its biasing force may be released merely by removing a preinstalled pin.

These and other objects that may hereinafter become apparent are accomplished according to the invention by providing a belt-tensioning apparatus which is adapted for mounting adjacent an endless belt and for applying to the belt an optimum tensioning force. The belt-tensioning apparatus includes a pivot member defining a first pivot axis, a housing arranged concentrically about the first pivot axis and supporting a rotatable belt-tensioning member eccentrically of the first pivot axis, biasing means for driving the housing and the belt-tensioning member about the first pivot axis in a belt tensioning direction, and a cam assembly coupled with the housing for enabling limited movement of the housing about the first pivot axis in the opposite, tension-diminishing direction. An assembly pin secures the apparatus in its spring loaded state until installation, upon which time, after the pin is removed, the biasing means drives the belt-tensioning member into belt-tensioning engagement with the endless belt.

Preferably, the belt-tensioning member is a pulley and bearing assembly, and the housing is provided with an axial protrusion defining a second pivot axis, disposed eccentrically of the first pivot axis, on which the bearing assembly is mounted.

The cam assembly includes a clutch engaged with the pivot member, a cam housing mounted concentrically about the clutch, and a plurality of camming elements interposed between the cam housing and the pulley-supporting housing. The clutch is preferably of the type known as a one-way clutch, and is adapted to permit rotation only in the belt-tensioning direction. The cam housing is secured to the one-way clutch, and is capable of rotation only in the belt-tensioning direction about the pivot member.

The outer surface of the cam housing is provided with axially extending camming lobes which correspond in configuration with recesses provided on the inner surfaces of cam follower elements secured about the cam housing. Preferably the cam lobes and recesses are configured to impart radial movement to the cam follower elements as these elements ride over the cam lobes. Pin members disposed on the exterior of the cam follower elements engage in slots provided in the wall of the pulley-supporting housing. Preferably, the length of the slots is determined as a function of engine, pulley and material parameters, and limits the amount of reverse rotation of the belt-tensioning apparatus accordingly.

When the tension in the endless belt increases, the pulley-supporting housing is urged by the belt to rotate about the pivot member in an opposite reversed direction. In turn, the pulley-supporting housing urges the cam follower elements, by means of the pin and slot engagement, to ride up onto the cam lobes of the rotationally limited cam housing and move radially outwardly to lock up with the inner surface of the pulley-supporting housing whereby further reverse rotation of the belt-tensioning apparatus is prevented.

BRIEF DESCRIPTION OF THE DRAWINGS

These and other objects, features and advantages of the present invention will be more fully appreciated from the following detailed description when considered in connection with the accompanying drawings, in which the same or like reference numbers designate the same or corresponding parts throughout and in which.

DETAILED DESCRIPTION OF THE INVENTION

Figure 1:
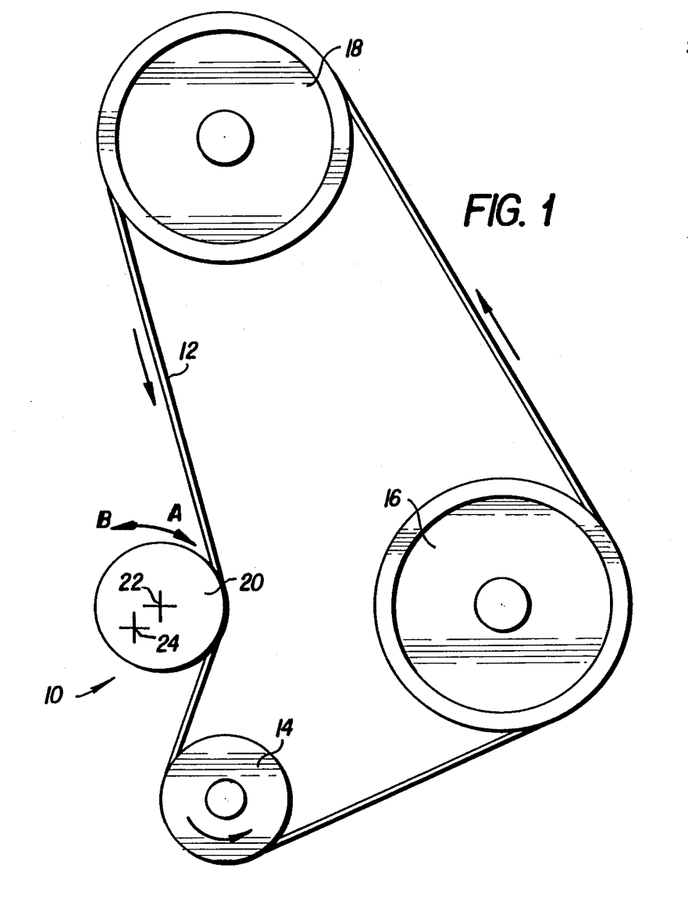
FIG. 1 is a diagrammatic view looking toward the side of an engine and illustrating an endless drive belt operatively connected to and driving various engine components, with the improved belt tensioner apparatus of the present invention engaged with the belt.

FIG. 1 of the drawings schematically illustrates the improved belt tensioner apparatus 10 of the present invention mounted on the side of an engine and disposed in tensioning engagement with an endless flexible member 12, such as a ddrive or timing belt, of a power transmitting drive system. The drive system of FIG. 1 typically consists of a plurality of belt pulleys or sheaves having configurations and diameters determined by the particular engine components with which they are associated and their locations relative to one another. The pulleys illustrated are supported on their respective engine components, which in turn are mounted on an engine (not shown) in a usual manner known in the art. Belt 12 preferably is operated in a single vertical plane to eliminate binding and skewing of the belt.

The belt drive system 10 illustrated in FIG. 1 includes the belt 12, a main driving pulley 14 operatively coupling the output of the main drive or crank shaft of the engine to the belt 12, a pulley 16 operatively coupling the belt 12 to an accessory drive shaft, and a pulley 18 operatively coupling belt 12 to a camshaft. The belt tensioner apparatus 10 is positioned between the main driving pulley 14 and the camshaft pulley 18, but its position may be varied depending upon engine size and/or component location. The belt tensioner apparatus 10 includes a pulley 20 which rotatably engages the belt 12. The pulley 20 is mounted for rotation on the belt tensioner apparatus 10 about a first axis 22, and is urged into tensioning engagement with the belt 12 by pivoting of the belt tensioning apparatus 10 (in a clockwise direction as shown in FIG. 1) about a second axis 24 offset from the first axis 22. It is to be understood that the belt drive system shown in FIG. 1 could be adapted for driving components associated with other systems, such as pumps and vehicle accessories.

Figure 2:
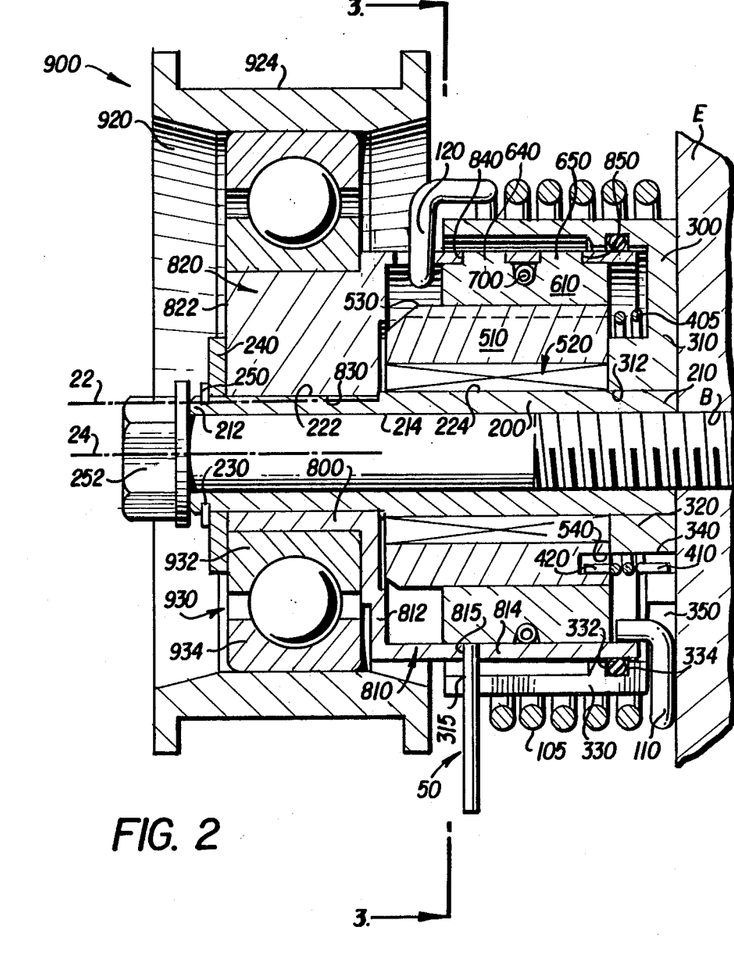
FIG. 2 is a cross-sectional view of the belt tensioner apparatus of the invention installed on the engine.
Figure 3:
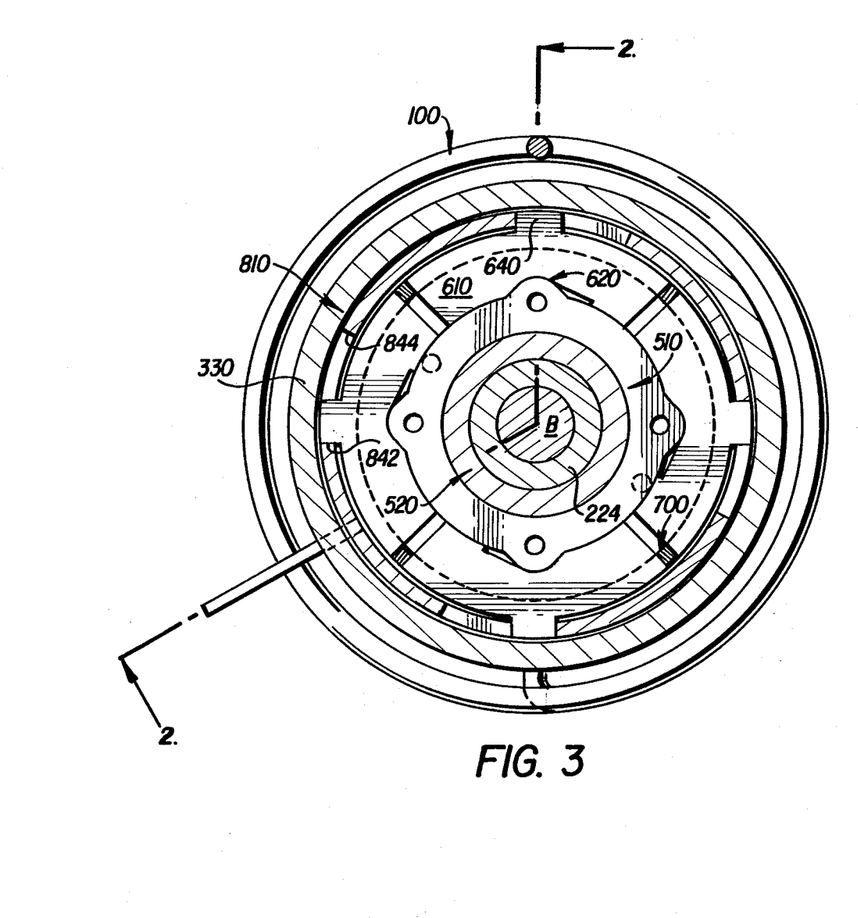
FIG. 3 is a cross-sectional view of the belt tensioner apparatus taken along section line 3—3 in FIG. 2.
Figure 6:
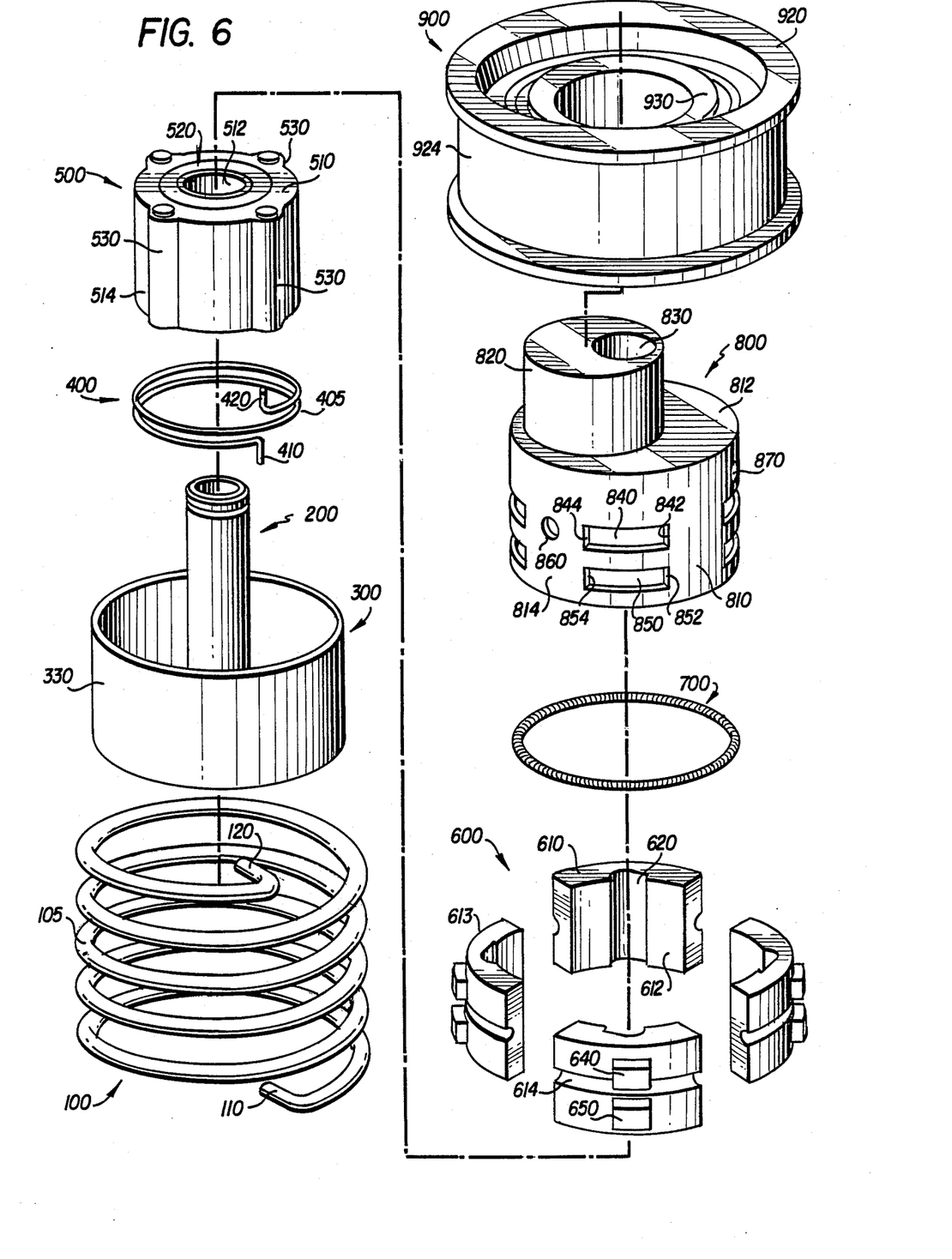
FIG. 6 is an exploded perspective view of the principal components of the tension adjusting mechanism of the present invention.

FIGS. 2, 3 and 6 of the drawings illustrate in greater detail the components which comprise the belt tensioner apparatus 10 and, in particular, the automatic tension adjusting mechanism of the present invention. FIG. 2 illustrates the belt tensioner apparatus 10 in a side sectional view. FIG. 3 is a cross-section of the apparatus taken along section line 3—3 in FIG. 2. FIG. 6 shows the principal components of the belt tensioner apparatus in an exploded perspective view.

Referring now to the drawings in detail, and in particular to FIG. 6, it can be seen that the principal components of the belt tensioner apparatus 10 include a primary torsion spring 100, a pivot shaft 200, a pivot housing 300, a secondary torsion spring 400, a cam clutch assembly 500, a cam follower assembly 600, a garter spring 700, a pulley housing 800 and a belt engaging pulley assembly 900. Torsion springs 100 and 400, pivot shaft 200, pivot housing 300, cam clutch assembly 500, cam follower assembly 600, spring 700 and pulley housing 800 comprise the automatic tension adjusting mechanism.

Primary torsion spring 100 is a helical coil spring having a coil body 105, a first end 110 and a second end 120. Although not essential to the operation of the belt-tensioning apparatus, the spring ends 110, 120 have been illustrated as being radially inwardly turned. The primary torsion spring 100 is employed to pivotally urge the belt tensioner apparatus 10 about the pivot axis 24 (in a clockwise direction as seen in FIG. 1) so that the belt tensioner apparatus 10 can apply a tensioning force to the belt 12. Secondary torsion spring 400 is a helical coil spring having a coil body 405, an axially turned first end 410 and an axially turned second end 420, with the first and second ends preferably being oppositely directed (as illustrated in FIGS. 2 and 6). The spring constants of torsion springs 100 and 400 are determined as a function of the materials and thermal properties of the various pulleys, the belt, and the engine and components, as well as the range of temperatures to which these components will be subjected during operation of the engine, and the desired optimum belt tension to be achieved.

As seen in FIG. 2, the pivot shaft 200 is a one piece, cylindrical member having a first end 210 adapted to seat on the engine block E, a second end 212, and a centrally disposed bore 214 extending from the first end to the second end. The longitudinal axis of the bore 214 constitutes the pivot axis 24 of the belt tensioner apparatus 10 schematically depicted in FIG. 1. The radially outer surface of the pivot shaft 200 preferably includes a first section 222 and a second shaft section 224 having an outside diameter greater than the outside diameter of the first section 222. An annular groove 230 is formed in the first shaft section 222 at a location adjacent the second end 212 of the pivot shaft 200.

Pivot housing 300 comprises a cup-shaped member which includes an annular base portion 310, having a concentric, axially extending, throughbore 312, an axial extending annular boss 320 located at the radially inner region of the base portion, and an axially extending annular flange 330 disposed about the radially outer periphery of the base portion. The throughbore 312 is formed with an internal diameter of a dimension corresponding to the external diameter of the second shaft section 224 of the pivot shaft 200. The pivot housing 300 is secured to the shaft section 224 of the pivot shaft 200 in any conventional manner which will prevent rotation of the pivot housing 300 relative to the pivot shaft 200, as for example, by means of a friction press fit, a key and slot fit, or by a weld. Alternatively, the pivot housing 300 and the pivot shaft 200 may be formed as a single, unitary piece. An annular recess 332 is formed in the region of the radially inner face of the annular flange 330 adjacent the annular base portion 310, and an annular elastomeric friction element 334 is disposed in the recess 332. A first aperture 340 extends axially through the base portion 310 and the annular boss 320, and a second aperture 350 extends radially into the base portion 310 at the intersection of the base portion 310 and the annular flange 330.

Cam clutch assembly 500 comprises a cylindrical cam housing 510 having a centrally disposed, axially extending bore 512, and a conventional one-way clutch assembly 520 (shown schematically). The clutch assembly 520 is tightly secured to cam housing 510 in bore 512 by any suitable manner, as for example by a press or friction fit. The invention also contemplates forming the cam housing 510 and the clutch assembly 520 as a single unitary part. The clutch assembly 520 is mounted on the second shaft section 224 of pivot shaft 200 and functions to permit rotation of the cam housing 510 about pivot shaft 200 in one direction only, i.e., clockwise as seen in FIG. 3.

The exterior surface 514 of cam housing 510 includes a plurality (four are shown) of peripherally disposed, axially extending, cam lobes 530. The exterior surfaces of each of the cam lobes 530 have a generally cylindrical configuration, and constitute camming surfaces (the purpose of which will be described below). An axially extending opening 540 is formed in one end surface of the cam housing 510 and is radially located therein in order to receive and secure the axially extending second end 420 of the torsion spring 400.

Cam follower assembly 600 comprises a plurality of discrete arcuate follower elements 610 having a shape which is adapted for a specified manner of engagement with the exterior surface of the cam housing 510. Each cam follower element 610 includes a radially inner surface 612 having an arcuate shape with a first radius, and a radially outer surface 613 having an arcuate shape with a second radius larger than the first radius. The central region of the inner surface 612 of each cam follower element is provided with an axially extending, partially cylindrical recess 620 having a configuration which is adapted to receive a respective one of the cylindrically shaped cam lobes 530 located on the exterior surface of the cam housing 510. Each recess 620 (illustrated more clearly in FIGS. 3 and 4) comprises a first leading surface 622 and a second trailing surface 624. The leading surface of each recess 620 is substantially cylindrical and has a contour that is substantially congruous with the contour of the leading edge 532 of cam lobe 530. The trailing surface 624 of each recess 620 is substantially planar, with the portion of trailing surface 624 adjacent the leading surface 622 having a greater radial extent than the portion of trailing surface 624 farthest from the leading surface. The outer surface 613 of each cam follower element is provided with a circumferential groove 614 located about one-half the axial extent of the element. A pair of axially aligned, radially extending pins 640, 650 are provided on the outer surface of each cam follower element. The pins are disposed adjacent to one another on opposite sides of the circumferential groove 614, and in a position on the outer surface 613 which is in alignment with the recess 620 on the inner surface 612. Each cam follower element 610 is mounted on the exterior surface of the cam housing 510 so as to locate a respective one of the cam lobes 530 in the recess 620. The cam follower elements are maintained in this assembled state by garter spring 700 which is placed about the plurality of cam follower elements in the respective circumferential grooves 614 formed in the outer surface of the cam follower elements.

Pulley housing 800 comprises a first cylinder 810 of a first external diameter and a second cylinder 820 having an external diameter smaller than the first external diameter. The second cylinder 820 is formed integrally with, and extends axially from, the end wall 812 of the first cylinder 810, with the longitudinal axis 22 of the second cylinder 820 being laterally offset from the longitudinal axis 24 of the first cylinder 810. Extending from the surface 822 of the second cylinder to and through the wall 812, is a cylindrical bore 830, the longitudinal axis of which coincides with the longitudinal axis of the first cylinder 810. The diameter of the bore 830 is slightly larger than the outside diameter of the first shaft section 222 of the pivot shaft 200 and pulley housing 800 is supported on pivot shaft 200 for rotation about the shaft longitudinal axis (i.e., pivot axis 24). The annular wall 814 of the first cylinder 810 is formed with a plurality of equidistantly spaced, circumferentially extending slot formations 840, 850. The slot formations may consist of axially separated slot pairs (as illustrated) or a single slot. The circumferential extent of the slot formations is determined as a function of the thermal expansion characteristics of the engine block and cylinder head to which the tnnsioner is being applied, as well as the physical size of the engine, the material and construction of the endless belt, the diameter and material of the other pulleys (or sprocket gears), and the geometric configuration of the pulley (or sprocket gears) and belt system. The function of the slot formations (which will be described in greater detail in connection with FIGS. 4 and 5) is to provide limits for the amount of reverse rotation which the belt tensioning apparatus will accommodate. In the embodiment illustrated in FIG. 6, each slot formation corresponds with the pin formation carried by the cam follower elements 610. In particular, each pair of slots consist of a first slot 840, and a second slot 850 spaced axially from the first slot by a distance corresponding to the distance between pins 640, 650. The number of pairs of slots corresponds to the number of cam lobes 516 provided on the exterior surface of cam housing 510, and each of slots 840, B50 includes a leading edge 842, 852 and a trailing edge 844, 854 (see FIGS. 3 and 4), and is dimensioned to receive a respective one of pins 640, 650 carried on each cam follower element 610. The annular wall 814 of the first cylinder is further provided with a first aperture 860 preferably located between two adjacent first slots 840 and a second aperture 870 preferably located above one of the pairs of axially aligned first and second slots.

Belt engaging pulley assembly 900 comprises a pulley member 920 having an external surface 924 for engaging the belt 12, and a conventional bearing assembly 930. The bearing assembly 930, which is firmly secured within pulley member 920 in a conventional manner, includes an inner race (FIG. 2) 932 which is mounted on the second cylinder 820 of pulley housing 800. The outer race 934 of the bearing assembly 930 rotates freely along with pulley member 920, relative to the bearing assembly inner race 932, about the longitudinal axis 22 of the second cylinder 820.

Referring now to FIGS. 2 and 3, the assembled belt tensioner apparatus 10 of the present invention is seen to include pivot shaft 200 positioned with its first end 210 in engagement with engine block E and its bore 214 aligned with the bore B in the engine block E. Clutch assembly 520 is mounted on the larger diameter second shaft section 224 of pivot shaft 200, as is the pivot housing 300. Pulley housing 800 is rotatably supported on the smaller diameter shaft section 222 of pivot shaft 200. The annular wall 814 of the pulley housing lower cylinder 810 is nested within the pivot housing annular upstanding flange 330 with a small amount of diametrical clearance. The annular elastomeric friction element 334 is carried in the annular recess 332, and is loaded in compression by engagement between the radially external surface of annular wall 814 and the radially internal surface of recess 332. Friction element 334 acts to dampen belt harmonics generated by cyclic loading and unloading of valve springs, and by crankshaft power strokes, which are transmitted to the pulley housing 800. Pulley member 920 of the pulley assembly is rotatably carried by pivot housing 800, with the inner race of the bearing assembly 930 disposed in frictional engagement with the second cylinder 820 of the pulley assembly. Relative rotation between the inner race 932 and the second cylinder 820 is thereby prevented, and the longitudinal axis of the second cylinder 820 becomes the axis of rotation for pulley member 920. A flat washer 240 clamps the inner race of the bearing assembly onto the shoulder between the first and second pivot shaft sections, and an annular fastener ring 250, which snaps into the annular groove 230 on pivot shaft 200, holds the pulley assembly 900 securely in place on the pivot shaft. A bolt 252 extends through the pivot shaft, and is threadedly engaged into the bore B in the engine E to secure the belt tensioning apparatus 10 to the engine. Preferably, the friction generated by the axial force of the bolt 252 through the pivot housing 300, and the contact of the pivot housing and the engine, prevent the pivot housing 300 from rotating relative to the bolt 252. Alternatively, either of the pivot housing 300 or the pivot shaft 200 could be provided with a pin; tab, or like protrusion which could fit into a receiving bore in the engine to prevent rotation, as well as for providing an assist in initially locating the apparatus on the engine.

Rotatably supported within the pivot housing 300 on pivot shaft 200 are the cam housing 50 and the cam follower elements 610. Each cam follower element 610 is held in contacting engagement with the exterior surface of cam housing 510 by garter spring 700 such that each cam follower element surrounds a respective cam lobe 530. Spring 700 surrounds all the cam follower elements and engages in the circumferential groove 614 of each element. Cam follower assembly 600 is positioned in the interior of the cylinder 810 of the pulley housing 800, with the axially aligned pair of pins 640, 650 of each cam follower element engaging within a respective pair of the axially aligned arcuate slots 840, 850 formed in the annular wall of cylinder 810. The primary torsion spring 100 is situated concentrically about the annular upstanding flange 330 of the pivot housing 300. The first end 110 of the primary torsion spring 100 is engaged in the second aperture 350 in the base portion of the pivot housing 300. The second end 120 of the primary torsion spring 100 engages in the opening S70 in the annular wall 814. The primary torsion spring 100 is loaded to drive pulley housing 800 with a rotational force about the pivot axis 24 in a belt tensioning direction (clockwise in FIG. 1). The secondary torsion spring 400 is disposed concentrically about the annular boss 320 of the pivot housing 300, with its first end 410 engaged in the axial opening 540 of cam housing 510 and its second end 420 engaged in the axially extending aperture 340 of the pivot housing 300. The secondary torsion spring 400 is loaded in such a manner as to urge cam housing 510 in a second, opposite rotational direction about pivot axis 24, i.e., counterclockwise as seen in FIG. 3. A pin 50 fits through a hole 315 in the annular flange 330 of the pivot housing and through a corresponding hole 815 in the annular wall of the pulley housing first cylinder 810 and is provided to prevent relative rotation of the two housings during assembly of the belt tensioner apparatus, and during installation of the apparatus onto the engine.

OPERATION OF THE INVENTION

Once the belt tensioner apparatus of the invention is assembled and installed on the engine, the pin 50 is removed and discarded, and tensioning of the belt 12 shown in FIG. 1 begins. When pin 50 is removed, the primary torsion spring 100 pivots pulley housing 800 eccentrically about pivot axis 24, i.e., about the longitudinal axis of pivot in a clockwise direction until pulley 920 engages belt 12. Upon engagement of the belt by the pulley 920, the belt 12 is placed under tension. The amount of tension is determined as a function of the torsional force of spring 100, the geometry of the pulley 920 and pulley housing 800 and the belt wrap angle. More particularly, the amount of tension is determined in accordance with the following equations and accompanying diagram:

$$F_T = 2T\sin\frac{B}{2}$$

SUMMING MOMENTS, $$M_S - M_O - M_F = F_T X\sin\theta$$

$$\frac{M_S - M_O - M_F}{X\sin\theta} = F_T = 2T\sin\frac{B}{2}$$

where:
T = Belt Tension
$F_T$ = Force Acting Thru Pulley Center Resulting from T
B = Belt Wrap Angle
$\theta$ = Angle Between Centers and $F_T$
X = Offset
$M_S$ = Spring Moment
$M_O$ = O-Ring Moment
$M_F$ = Friction Moment When belt tensioning takes place, prior to starting the engine and afterwards while the engine is operating, harmonic vibrations of the engine must be accommodated. These vibrations tend to urge pulley 920 to rotate about pivot axis 24 in a direction opposite to the belt tightening direction, i.e., in a belt loosening direction. However, such harmonic vibrations are damped out by the elastomeric friction element 334 disposed in recess 332 of pivot housing annular flange 330.

As the engine warms to operating temperature, the centerline distances between the camshaft, the crankshaft and the belt tensioner pulley 920 increase due to thermal expansion of the engine. In addition, the diameter of each belt-engaging pulley or sprocket wheel increases with the increased engine temperature. The combined effect of such thermally-produced expansions is the application, by the belt 12, of a force to the belt tensioning apparatus 10 in the belt-loosening direction (i.e., in the direction indicated by the arrow B shown in FIG. 1). Movement of the belt tensioning apparatus 10 shown in FIG. 1 in the belt-loosening direction of arrow B would permit a reduction in the tension which initially was applied to the belt 12 or, in the alternative, the maintenance of a predetermined optimum tension. Movement of the belt-tensioning apparatus 10 in the belt-loosening direction is made possible by the automatic tension adjusting mechanism of the present invention, shown in detail in FIGS. 4 and 5.

When the belt-tensioning apparatus 10 of the invention is pivoted into belt-tightening engagement with the belt 12, (clockwise in FIG. 1) the one-way clutch 520 facilitates pivoting of the pulley housing 800, along with all elements contained within pulley housing 800, about the pivot axis 24. When the belt-tensioning apparatus is pivotally urged in a belt-loosening (counterclockwise) direction about pivot axis 24, the pulley housing 800 pivots counter-clockwise about pivot axis 24, but the one-way clutch assembly 520, along with the cam housing 510, is prevented from pivoting in this counter-clockwise belt-loosening direction. Garter spring 700 holds each of the cam follower elements 610 in contact with a respective cam lobe 530, and the small amount of clearance between the radially outer surfaces 613 of the cam follower elements and the radially inner surface of the annular flange 810 of the pulley housing 800 allows the cam follower elements 610 to remain stationary relative to the cam housing 510. As the belt-tensioning apparatus pivots about axis 24 in the counter-clockwise tension reducing direction, pulley housing 800 rotates relative to the cam follower elements 610, and insofar as the pins 640, 650 are always engaged within slots 840, 850 in the pulley housing first cylinder 810, when the engine reaches its maximum operating temperature, each slot 840, 850 moves from a first position in which the pins 640, 650 are positioned adjacent the leading edges 842 of their respective slots (see FIGS. 3 and 4) to a second position in which the pin 640, 650 is positioned adjacent the trailing edge 844 of its respective slot (see FIGS. 3 and 4). Further rotation of the pulley housing 800 about pivot axis 24 causes the cam follower elements 610 to be driven in rotation by the trailing edges 844 of the slots 840, 850 relative to the cam housing 510. When this happens, the trailing edges 624 of the recess 620 in the cam follower elements are forced into camming engagement with the cam lobes 530, and as each trailing edge 624 rides up over its respective cam lobe 530, the rotational movement of the associated cam follower element 610 relative to the cam housing 510 is converted to radial movement. The result is that the cam follower elements 610 are moved radially toward, and into engagement with, the annular wall 810 of the pulley housing lower cylinder. At this point, the pulley housing 800 is operatively connected to the one-way clutch 520 and further reverse rotation of the pulley housing 800 is thus prevented.

Figure 4:
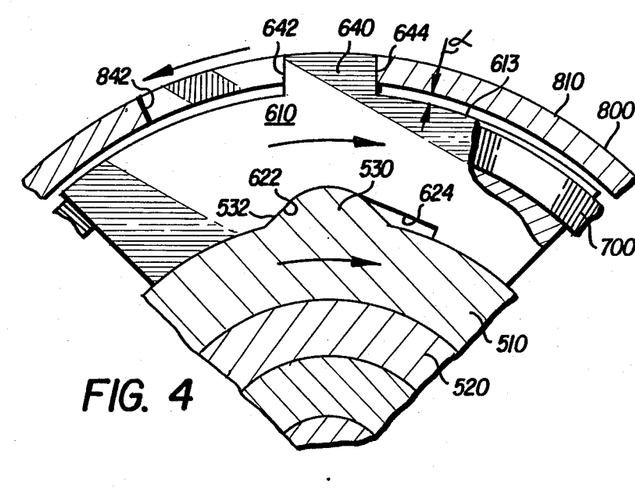
FIG. 4 is an enlarged detailed view of the automatic tension adjusting mechanism incorporated into the belt tensioner apparatus of the present invention, and illustrating a first tension adjustment position.
Figure 5:
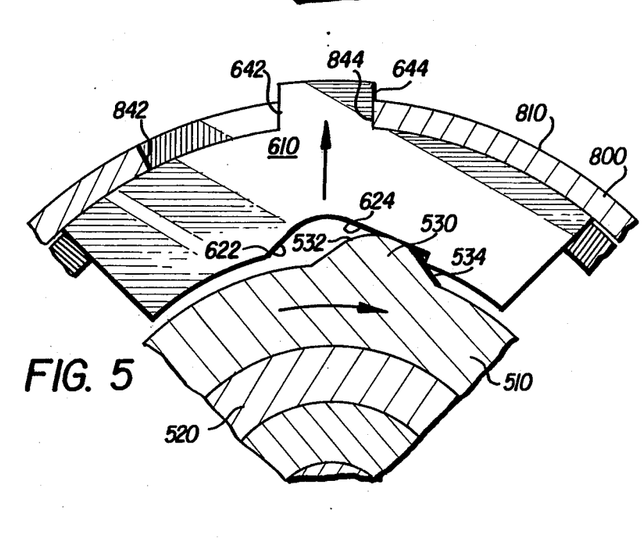
FIG. 5 is an enlarged detailed view of the automatic tension adjusting mechanism incorporated into the belt-tensioner apparatus of the present invention, and illustrating a tension adjustment position.

As the temperature of the engine decreases, whether during operation or after shut-down of the engine, pulley housing 800 reverses its rotational movement relative to the cam housing 510, i.e., moving clockwise in FIGS. 3–5. The cam follower elements 610 are held in their radially extended positions by the wedging action of the cam lobes 530 with the trailing edges 624 of the recesses 620, as the leading edges 842 of the pulley housing slots move back in the clockwise direction under the rotational biasing of the primary torsion spring 100.

During this reverse rotational movement of pulley housing 800, the secondary torsion spring 400 acts on cam housing 510 to restrain it from rotating, along with the pulley housing 800, in the clockwise direction. The leading edges 842 of the slots then rotate, with rotation of the pulley housing 800, from the position shown in FIG. 5 to the position shown in FIG. 3 so that the leading edges 842 about the leading edges 642 of the cam follower elements. Further rotation of the pulley housing 800 in the clockwise direction causes the trailing edges 624 of the cam follower element recesses 620 to become disengaged from cam lobes 530. The cam follower elements 610 are thereby moved inwardly by garter spring 700 and pulley housing 800 is then released for free rotational movement in the clockwise, belt-tensioning direction.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. Apparatus for applying an optimum tensioning force to an endless belt or the like, comprising: pivot means defining a first pivot axis; belt engaging means supported for rotation about said first pivot axis; biasing means for urging said belt-engaging means in a first direction of rotation about said pivot means into belt-tensioning engagement with said belt; and means, responsive to externally induced changes in tension in said belt, for automatically varying the tensioning force applied to said belt, said varying means being disposed within said biasing means and including means, displaceable radially of said first pivot axis, for limiting the amount of decrease in applied tensioning force, said means for automatically varying the tensioning force applied to said belt including a first housing supported for rotation about said pivot means, a second housing supported for rotation aboout said pivot means in said first direction only, and means for selectively coupling said first housing with said second housing, said belt-engaging means being supported by said first housing, whereby the tension in said belt is optimally maintained.

2. The apparatus of claim 1, wherein said first housing is supported by said pivot means for rotation in a reversed direction about said first pivot axis, said first housing including means, selectively engageable with said coupling means, for actuating said limiting means when said first housing rotates in the reversed direction.

3. The apparatus of claim 2, wherein
   said second housing includes camming means, and
   said coupling means comprises means, movable by said camming means into engagement with said first housing, for preventing rotation of said first housing in said reversed direction when said limiting means becomes actuated.

4. The apparatus of claim 3, wherein said preventing means is disposed about the exterior of said camming means, and is urged laterally of said first pivot axis by said camming means when said first housing rotates in said reversed direction.

5. The apparatus of claim 4, wherein said limiting means comprises slot means in said first housing, said slot means extending about said first pivot axis, and
said preventing means comprises pin means engaged within said slot means.

6. The apparatus of claim 5, wherein
said slot means comprises a plurality of slots, and
said pin means comprises a plurality of pins,
each of said slots having a first end and a second end, and said pins being engageable with said first end when said first housing rotates in said first direction and with said second end when said first housing rotates in said reversed direction.

7. The apparatus of claim 6, wherein the number of said slots and the number of said pins are the same.

8. The apparatus of claim 7, wherein said plurality of slots comprises pairs of axially aligned slots.

9. The apparatus of claim 6, wherein said plurality of slots comprises pairs of axially aligned slots.

10. The apparatus of claim 6, wherein said slots are disposed substantially equidistantly from one another.

11. The apparatus of claim 4, wherein said preventing means and said camming means include cooperating camming surfaces on adjacent faces, each said camming surface of said preventing means normally being urged into engagement with each said camming surface of said camming means.

12. The apparatus of claim 11, wherein said preventing means comprises a plurality of elements equidistantly spaced from one another.

13. The apparatus of claim 4, and further including
resilient means, disposed about said preventing means, for loosely maintaining said preventing means in engagement with the exterior of said camming means.

14. The apparatus of claim 13, wherein said preventing means comprises a plurality of elements equidistantly spaced from one another.

15. The apparatus of claim 1, wherein
said pivot means comprises a first annular member disposed concentrically about said first pivot axis and having first and second axially spaced regions, and a second annular member disposed concentrically about said first region of said first annular member, and
said belt-engaging means comprises a first housing including a first annular portion disposed about said first region of said first annular member, and within said second annular member, of first pivot means, and a second annular portion engaging with said second region of said first annular member,
said second annular portion of said first housing defining a second pivot axis radially displaced from said first pivot axis.

16. The apparatus of claim 15, wherein said belt-engaging means further comprises pulley means disposed on said second annular portion of said first housing.

17. The apparatus of claim 15, wherein
said biasing means includes attachment portions and a body portion, said attachment portions being engaged with said second annular member of said pivot means and with said first annular portion of said first housing, said body portion of said biasing means being disposed radially outside of said pivot means.

18. The apparatus of claim 17, wherein said biasing means comprises a torsion spring.

19. The apparatus of claim 15, wherein said second annular member of said pivot means and said first annular portion of said first housing are axially overlapped, and said second annular member includes resilient means, engagable with said first annular portion of said first housing, for damping harmonic vibrations imparted to said belt-engaging means by said belt.

20. The apparatus of claim 15, wherein
said changing means comprises a second housing disposed between said first annular portion of said first housing and said first region of said pivot means first annular member, said second annular housing including means for coupling said limiting means with said first housing.

21. The apparatus of claim 20, wherein said second housing comprises
first annular means, mounted on said first region of said first annular member, for rotating in said first direction only;
second annular means, mounted on said first annular means, for rotating in said first direction and a second reversed direction; and
means for coupling said second annular means with said first housing,
whereby said first housing may be rotatable about said first pivot axis in either direction.

22. The apparatus of claim 21, wherein said first annular means for rotating in said first direction only comprises one-way clutch means.

23. The apparatus of cliam 21, wherein said second annular means comprises a plurality of circumferentially spaced, radially movable elements, and said first annular means comprises means for moving said elements radially outwardly when said first housing rotates in said second direction.

24. The apparatus of claim 23, wherein said coupling means comprises pin means carried by said elements and means, carried by said first housing, for receiving said pin means.

25. The apparatus of claim 24, wherein said receiving means comprises openings in said first housing, said pin means being disposed in said openings at all times.

26. The apparatus of claim 15, and further including removable means, coupling said first housing with including removable said pivot means, for maintaining said biasing means in a first loaded condition prior to installation of said apparatus,
said maintaining means being removable after installation of said apparatus, said biasing means becomes operative to urge said belt-engaging means to at least one position in which said belt-engaging means engages said belt to maintain said optimum tension.

27. The apparatus of claim 15, wherein said belt comprises a timing belt.

28. Apparatus for mataining a predetermined optimum tension on an endless power transmission member, comprising:
pivotable housing means adapted to be located adjacent the transmission member;
means, carried by said housing means, for applying a tensioning force to the endless power transmission member;
means for pivoting said housing means in a first direction to move said applying means into engagement with the endless power transmission member so that a predetermined tensioning force is applied to the endless power transmission member, said pivoting means including one-way clutch means;

means, automatically responsive to change in tension in the endless power transmission member, for enabling reversal of the direction of pivoting of said housing means so that the applied tensioning force may be reduced, said direction reversing means including intermediate means for operatively coupling said housing mean to said clutch means, and said coupling means including means, displaceable from said clutch means into engagement with said housing means, for limiting the amount of reverse pivoting of said housing means.

29. The apparatus of claim wherein said pivoting means comprises a pivot housing having a first elongated portion defining a first pivot axis about which said housing means is pivotably engaged and a second portion extending parallel to said first portion and disposed thereabout, and said housing means comprises a first portion defining a second pivot axis disposed eccentrically of said first axis and adapted for carrying said applying means, and a second portion extending parallel to said first pivot axis and disposed between said first and second portions of said pivoting means, said pivoting means further comprising means, engaged with said pivot housing second portion and said housing means second portion, for driving said housing means in rotation about said first pivot axis.

30. The apparatus of claim 28, wherein said pivoting means comprises a pivot member adapted to be secured adjacent the endless transmission member and defining a first pivot axis, said pivoting means further including biasing means, coupled between said pivot member and said pivotable housing means, for driving said housin means in rotation about said first pivot axis from a first position wherein no contact occurs between said applying means and said transmission member to at least one other position wherein said applying means applies a tensioning force to said transmission member.

31. The apparatus of claim 30, wherein said pivot member and said housing means each include axially extending side walls, the side walls of said pivot member being disposed exteriorly of the side walls of said housing means, and said side walls of said pivot member and said housing means supporting resilient means for damping out vibrations imparted to said housing means by engagement of the endless power transmission member with the endless transmission member.

32. The apparatus of claim 31, wherein said side walls of said pivot member and said housing means are annular.

33. The apparatus of claim 30, wherein said pivot member and said housing means include overlapping side walls and said biasing means engages said pivot member and said housing means in portions thereof outside said overlapping side walls.

34. The apparatus of claim 33, wherein said biasing member is disposed outside said pivot member.

35. The apparatus of claim 30, and further including releasable means for securing said pivot member and said housing means when said housing means is in said first position such that said biasing means is loaded prior to installation and use of the apparatus, whereby upon installation of said apparatus and release of said securing means said biasing means causes said housing means to pivot abot said first axis to said at least one other position such that said applying means engages said endless power transmission members in each of said other positions with said predetermined tensioning force.

36. The apparatus of claim 35, wherein said releasable securing means is removable from said apparatus.

* * * * *

UNITED STATES PATENT AND TRADEMARK OFFICE
CERTIFICATE OF CORRECTION

PATENT NO. : 4,834,694

DATED : May 30, 1989

INVENTOR(S) : Kelly D. MARTIN

It is certified that error appears in the above-identified patent and that said Letters Patent is hereby corrected as shown below:

Column 1, line 41, "synchronus" should be --synchronous--;

Column 3, line 16, "continuousl" should be --continuously--;

Column 5, line 23, "ddrive" should be --drive--;

Column 8, line 17, "tnnsioner" should be --tensioner--;

Column 9, line 32, "50" should be --510--;

line 51, "S70" should be --870--;

Column 10, line 11, after "pivot" insert --shaft 200,--;

Column 12, line 9, "S00" should be --800--;

lines 14 and 15, "leding" should be --leading--;

UNITED STATES PATENT AND TRADEMARK OFFICE
CERTIFICATE OF CORRECTION

PATENT NO. : 4,834,694

DATED : May 30, 1989

INVENTOR(S) : Kelly D. MARTIN

It is certified that error appears in the above-identified patent and that said Letters Patent is hereby corrected as shown below:

Claim 1, column 12, line 48, "aboout" should be --about--.

Claim 23, column 14, line 32, "cliam" should be --claim--.

Claim 26, column 14, lines 46 and 47, delete "including removable".

Claim 28, column 14, line 58, "mataining" should be --maintaining--;

column 15, line 10, "mean" should be --means--.

Claim 29, column 15, line 15, after claim insert --28,--.

Claim 30, column 15, line 38, "housin" should be --housing--.

Claim 35, column 16, line 33, "abot" should be --about--.

Signed and Sealed this

Twenty-seventh Day of February, 1990

Attest:

JEFFREY M. SAMUELS

Attesting Officer

Acting Commissioner of Patents and Trademarks